United States Patent [19]

Weglein

[11] 3,873,946

[45] Mar. 25, 1975

[54] ACOUSTIC SURFACE WAVE TAPPED DELAY LINE

[75] Inventor: Rolf D. Weglein, Los Angeles, Calif.

[73] Assignee: Hughes Aircraft Company, Culver City, Calif.

[22] Filed: Oct. 4, 1973

[21] Appl. No.: 403,710

[52] U.S. Cl. .................... 333/30 R, 310/9.8, 333/72

[51] Int. Cl. ........................... H03h 9/26, H03h 9/30

[58] Field of Search .................. 333/30 R, 72, 70 T; 330/5.5; 310/8, 8.1, 9.8

[56] References Cited

UNITED STATES PATENTS

| | | | |
|---|---|---|---|
| 3,633,118 | 1/1972 | Means et al. | 333/30 R X |
| 3,715,674 | 2/1973 | Bahr | 333/30 R X |
| 3,739,290 | 6/1973 | Marshall et al. | 330/5.5 |
| 3,798,577 | 3/1974 | Kasahara et al. | 333/72 X |

OTHER PUBLICATIONS

Marshall et al., "Observed Properties of an Acoustic-Surface-Wave Multistrip Coupler," in Electronic Letters, Aug. 12, 1971, pp. 463-464.

Marshall et al., "Novel Acoustic-Surface-Wave Directional Coupler with Diverse Applications," in Electronics Letters, Aug. 12, 1971, pp. 460-462.

*Primary Examiner*—James W. Lawrence
*Assistant Examiner*—Marvin Nussbaum
*Attorney, Agent, or Firm*—W. H. MacAllister; John Holtrichter, Jr.

[57] ABSTRACT

An acoustic surface wave device wherein a transducer launches a main beam of acoustic surface wave energy on a substrate of piezoelectric material in a first direction in which the material supports propagating surface wave energy and in which it has a high electromechanical coupling constant, and wherein at least one energy-tapping multistrip coupler is disposed on the substrate with a tapping portion in the path of the propagating beam and with an angularly offset launching portion whereby propagating energy tapped from the main beam is launched in a second direction in which the material supports propagating surface wave energy and in which it also has a relatively high electromechanical coupling constant, such tapped beam energy being intercepted by a receiving transducer disposed on the substrate in the path of the tapped energy launched by the multistrip coupler.

7 Claims, 2 Drawing Figures

ACOUSTIC SURFACE WAVE TAPPED DELAY LINE

BACKGROUND OF THE INVENTION

The background of the invention will be set forth in two parts.

1. Field of the Invention

This invention relates to acoustic surface wave devices and more particularly to tapped delay lines.

2. Description of the Prior Art

In recent years there has been increased interest in acoustic surface wave devices. Basically, an acoustic surface wave system comprises a source of RF signals, a smooth slab-like element or substrate of a material capable of propagating acoustic surface wave energy, and a load or utilization device. Electroacoustic transducers are attached or held in close proximity to the substrate to convert the RF energy to surface waves in the material and vice versa. One of the significant advantages of acoustic surface wave devices results from the fact that acoustic surface waves travel in a suitable substrate considerably slower than do electromagnetic waves in free space. As an example, a surface resonator operating at a given frequency is typically 100,000 times smaller than an electromagnetic wave resonator for the same frequency, and the high Q of acoustic media allows delay times of about 100 times that possible with low-loss electromagnetic waves.

The phenomenon of the propagation of elastic or surface waves was first described by Lord Rayleigh in an article entitled "On Waves Propagating Along the Plane Surface of an Elastic Solid," *Proceedings*, London Mathematic Society, Vol 17, pp. 4–11, November 1885. Devices utilizing such surface waves have the advantage of allowing easy access at all times to the propagating acoustic energy, to interact with it, to modify it, or to sample it in a tapped delay line configuration, for example.

In the past, tapped delay lines using acoustic surface wave techniques experienced serious reflection problems, that is, acoustic energy was reflected by each tapping transducer back along the main beam path to the main transducer where it is reflected back to adjacent tapping transducers and seen in the outputs of the devices as spurious double and triple transit echo signals. A standard technique of using double electrodes in the transducers was utilized in order to partially overcome this problem. The partial solution comes from the fact that echo signals produced by coupling between adjacent receiving transducers cannot be reduced by the double electrode technique.

A double electrode transducer is an interdigital array having two electrodes per one-half acoustic wave length. It does reduce some of the undesirable reflection characteristic but requires increased resolution in the lithographic process used to fabricate the arrays. It can therefore be seen that a technique which reduces undesirable tapping transducer reflection while not significantly increasing insertion loss and not requiring higher lithographic resolution, constitutes a significant advancement of the art.

SUMMARY OF THE INVENTION

In view of the foregoing factors and conditions characteristic of the prior art, it is a primary object of the present invention to provide an improved acoustic surface wave tapped delay line.

Another object of the present invention is to provide a tapped delay line with a reduced spurious transit echo characteristic and which does not include structure tending to significantly increase transducer insertion loss.

Still another object of the present invention is to provide an acoustic surface wave tapped delay line which does not require increased resolution in the lithographic reproduction of arrays used in the device.

Yet another object of the present invention is to provide an acoustic surface wave tapped delay line wherein spurious signal-producing coupling between adjacent receiving transducers is virtually eliminated.

In accordance with the present invention, an acoustic surface wave tapped delay line includes a substrate of piezoelectric material that is both capable of propagating acoustic surface wave energy and has a relatively high electromechanical coupling constant in more than one direction. Transducer means including at least one electroacoustic transducer is disposed on the substrate for launching an acoustic surface wave energy beam in the plane of the substrate in one of the aforementioned directions. The invention also includes tapping means including at least one multistrip tapping coupler disposed on the substrate, the coupler having a tapping portion in the path of the beam and having an angularly offset launching portion for propagating in another of the aforementioned directions energy tapped from the beam. Further, receiving means including an electroacoustic transducer disposed on the substrate in the path of the propagating energy launched from the angularly offset launching portion of the multistrip coupler is provided for receiving the energy tapped from the main beam. In accordance with a presently preferred embodiment of the invention, *y*-cut lithium niobate, which has a relatively high electromechanical coupling, constant in two angularly offset directions and is capable of propagating acoustic surface wave energy in these two directions, is utilized as the substrate material.

The features of the present invention which are believed to be novel are set forth with particularity in the appended claims. The present invention, both as to its organization and manner of operation, together with further objets and advantages thereof, may best be understood by making reference to the following description, taken in conjunction with the accompanying drawing, in which like reference characters refer to like elements in the several views.

DESCRIPTION OF THE PREFERRED EMBODIMENTS

Figure 1:
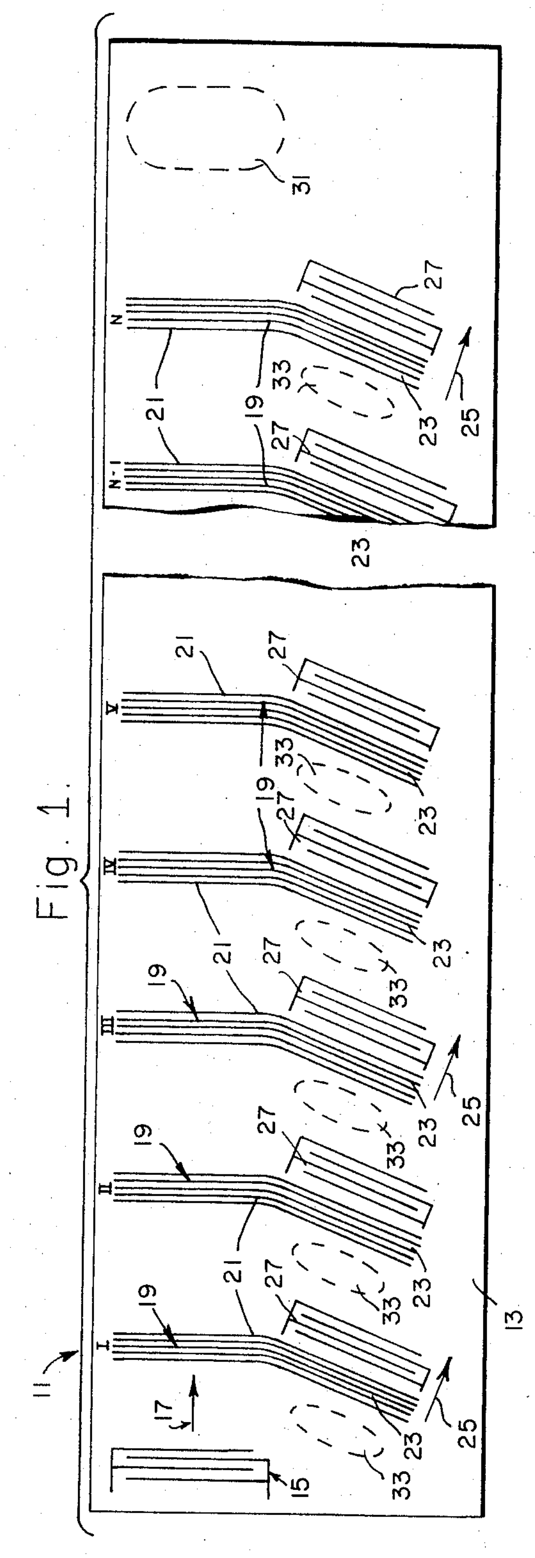
FIG. 1 is a schematic plan view of an acoustic surface wave tapped delay line constructed in accordance with one embodiment of the present invention.

Referring now to the drawing and more particularly to FIG. 1, there is shown an acoustic surface wave tapped delay line 11 having a substrate 13 of piezoelectric material, this material being capable of propagating acoustic surface wave energy in more than one direction and also having a relatively high electromechanical coupling constant ($k^2$) in these particular directions.

Disposed on the substrate 13 is a conventional electroacoustic input transducer 15 that launches an acoustic surface wave energy beam in the plane of the substrate in a direction generally indicated by arrow 17. This direction is chosen to be in one of the directions in which the substrate material is capable of propagating acoustic surface wave energy and in which it has the highest electromechanical coupling constant in that crystal plane.

Also disposed on the substrate 13, downstream of the transducer 15, are any desired number of multistrip couplers 19, each of these couplers having a tapping portion 21 in the path of the beam launches by the transducer 15, and having an angularly offset launching portion 23 for propagating in another of the aforementioned directions, herein designated for purposes of identification by arrow 25, energy tapped from the beam by a multistrip coupler 19.

The tapped energy launched in the substrate 13 along the direction 25 by the angularly offset launching portion 23 is received by a spaced electroacoustic receiving transducer 27 disposed on the substrate and oriented orthoganally to and in the path of the propagating tapped energy. The receiving transducer 27, as well as the beam launching transducer 15, may be of conventional design such as an interdigital electrode array bonded or otherwise mechanically attached to the substrate. A conventional design incorporates two electrodes per wavelength. The elements of the multistrip coupler, on the other hand, are generally more closely spaced than those of the launching or receiving transducers.

Both the launching and receiving transducers may have a desired number of intermeshed electrodes as known to those skilled in the art and they may be formed by any conventional process using any suitable electrically conductive material, such as but not limited to aluminum or gold, for example. For a more detailed description of the theory and construction of these transducers, and of the acoustic surface wave art generally, reference may be made to any of many well-known references, one of which is an article entitled "Surface Elastic Waves", by Richard M. White, in the Proceedings of the IEEE, Vol. 58, No. 8, August 1970.

The multistrip couplers 19 are modified versions of conventional multistrip coupler constructions wherein the launching portion 23 of each coupler is annularly offset from its tapping portion 21 in order to launch the tapped energy in the direction 25. A multistrip coupler operates on freely propagating acoustic surface wave energy with broad band width and low loss. It is an array of parallel metallic strips disposed on a piezoelectric substrate at somewhat less than half-wave intervals which can transfer acoustic power from one acoustic path to another. It has been found that for a given amount of acoustic power to be transferred, a particular number of strips are required for a given electromechanical coupling constant, $k^2$, in which a higher $k^2$ requires fewer such strips.

For a complete energy transfer (not desired here), the minimum number of coupler strips needed is obtained when the strip and gap widths are equal. A coupler of half the number of strips required for complete energy transfer, for example, splits an input beam into two components of equal intensity, the tapped energy having 90° phase advance over the energy propagating in the original beam. This phase advance is independent of frequency at frequencies removed from what is known in the art as the stop band frequency of the device, where the multistrip coupler elements are spaced exactly at one-half wavelength intervals.

When propagating surface wave energy is incident on the tapping portion of a multistrip coupler, potential differences are created between adjacent metal strips due to the well-known piezoelectric effect. These potentials are conducted by the strips to their launching portions where a tapped energy beam is generated in the piezoelectric substrate. In the case of the invention, this energy is launched in a direction to coincide with a second direction along which the substrate material exhibits both a relatively high $k^2$ and the ability to propagate acoustic surface wave energy. In the particular case where the main beam propagates along the $z$-direction on the $y$-cut crystal surface and the tapped energy propagates along a direction approximately ±22° with respect to the $z$-direction, the additional advantage results from the fact that group and phase velocities are collinear, thus simplifying the design and achieving minimum insertion loss.

For background information to the theory and operation of multistrip couplers, reference may be made to U.S. Pat. No. 3,739,290 and to such articles as "Novel Acoustic-Surface-Wave Directional Coupler With Diverse Applications" by F. G. Marshal and E. G. S. Paige in "Electronics Letters," Vol. 7, No. 16, pp. 460–464, 12 August 1971, and to an article entitled "Theory and Design of the Surface Acoustic Wave Multistrip Coupler" by F. G. Marshal, C. O. Newton and E. G. S. Paige, pp. 206–215, and to an accompanying article entitled "Surface Wave Multistrip Components and Their Applications" pp. 216–225, in IEEE Transactions on Microwave Theory and Techniques, Vol. MTT–21, No. 4, April 1973.

As noted above, one of the more important aspects of the invention is to direct the propagation of the tapped beam energy in a direction other than the direction of the main beam propagation and in which the substrate material has an additional high $k^2$ and in which it is able to propagate acoustic surface wave energy. Not many piezoelectric substrate materials have this unique anisotropic characteristic. However, it has been found that $y$-cut $z$-propagating lithium niobate ($LiNbO_3$) has these desired properties, as noted previously. For example, reference may be made to a publication entitled "A Method for Estimating Optimal Crystal Cuts and Propagation Directions for Excitation of Piezoelectric Surface Waves" by J. J. Campbell and W. R. Jones, IEEE Transactions on Sonics and Ultrasonics, Vol. SU-15, pp. 209–217, October 1968. FIG. 3 of this publication clearly shows that $y$-cut $LiNbO_3$ has further wave velocity extrema along two angularly offset directions in which $k^2$ is maximum and the group and phase velocities are collinear.

In operation, the input transducer 15 launches the main beam of acoustic surface wave energy in the direction of the arrow 17 ($z$-direction) on the $y$-cut face of the $LiNbO_3$ crystal plate 13. The beam travels the length of the substrate 13 to a conventional acoustic absorber 31 where it is completely absorbed. This absorbing can take many forms such as a variety of viscous matter, such as black wax, rubber cement, or alternately, it can take the form of a high resistivity region produced by ion bombardment. At various tapping points I, II, III, etc., along the beam path, a multistrip conducting array 19 is disposed having its respective intercepting or tapping portions 21 normal to the beam direction 17 while its extended or launching portion 23 is angled beyond the beam edge at, in the case of this particular piezoelectric material approximately ±22° with respect to the $z$-direction (arrow 17).

The number of strips in the multistrip arrays 19, as well as their filling factors (ratio of individual strip width to period), determines the fraction of the acoustic beam energy that is siphoned out of the main beam. The period of the arrays 19 is approximately the same as in the input transducer 15 and may be smaller, depending on the band width required. As an example, the number of strips for complete energy transfer from the main beam to the first tapping array 19 (I) is about 110, on $y$-$z$ $LiNbO_3$. If only a fraction $\Delta$ is to be tapped off, the number of electrodes in each of the tapping multistrip arrays 19 will be reduced proportionally to $\Delta \times 110$, for example.

The tapped acoustic energy is launched from the angularly extended or launching portion 23 in the direction $z$ ±22°, where as seen in the aforementioned IEEE article by J. J. Campbell and W. R. Jones, group and phase velocity of the surface waves on $LiNbO_3$ are collinear and the electromechanical coupling constant $k^2$ is simultaneously comparable to the value along the $z$-direction of the substrate material.

A receiving transducer 27 is disposed parallel to and facing the launching portion 23 of an associated one of the multistrip coupler arrays 19 to efficiently receive and detect tapped acoustic surface wave energy incident thereon as launched by the array. The angular position of the extended portion 23 of each of the couplers 19 prevents any reradiated energy from interacting directly with the main beam input transducer 15 and other tapping transducers, and if desired, could be absorbed by an associated conventional absorber element 33 as shown in FIG. 1, for example.

However, a fraction of the reradiated or tapped beam energy will couple back into the main beam from each of the multistrip couplers because of reciprocity of these tapping structures. This is a source of spurious echo signals in conventional tapped delay lines, but in the case of the present invention, the double transit echo is eliminated while the triple transit echo level is reduced by $\Delta^2$, where $\Delta$ is the fraction of beam energy tapped off by the individual multistrip couplers 19. Thus, these echo levels are substantially reduced while the tapping couplers 19 can be simultaneously designed with good impedance match, guaranteeing efficient detection.

Figure 2:
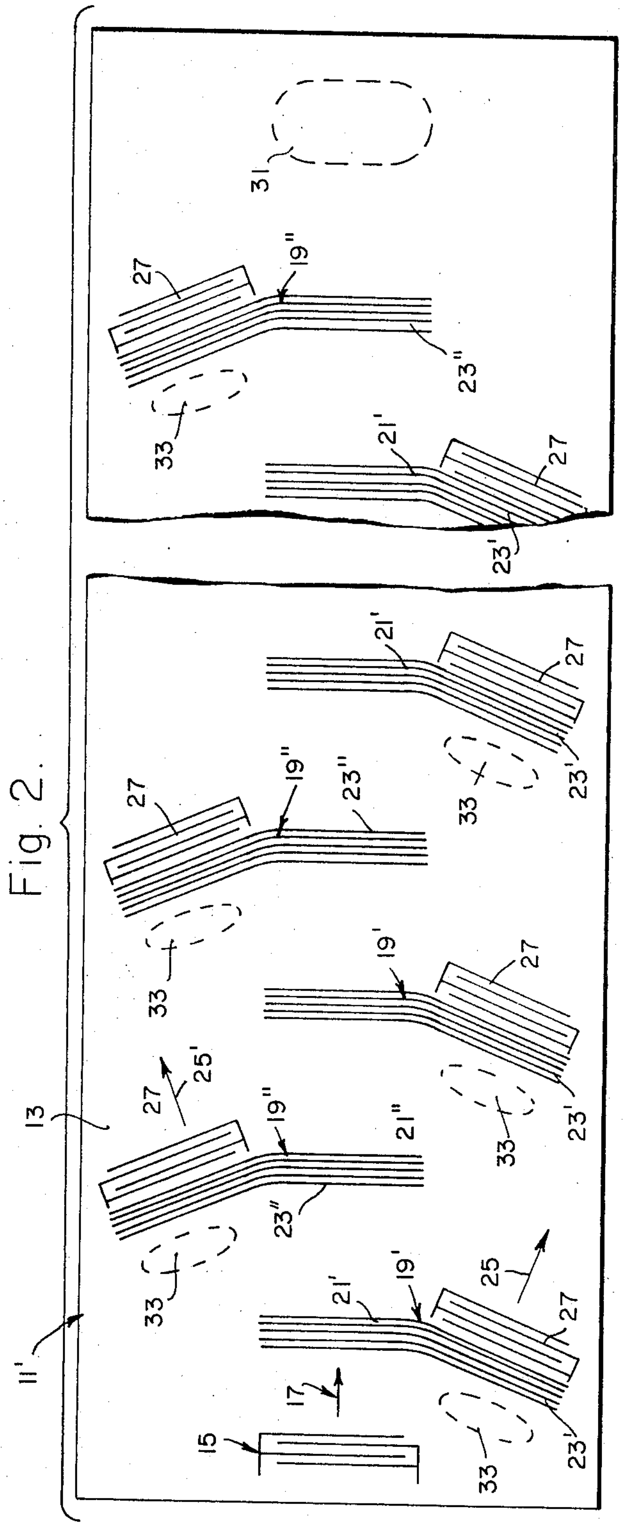
FIG. 2 is a schematic plan view of another embodiment of the present invention.

An alternate approach to constructing the invention is illustrated in FIG. 2 where alternate ones of the multistrip couplers 19' and 19'' and their associated receiving transducers 27' and 27'' are disposed on opposite sides of the main beam generated by the input transducer 15. As in the first described embodiment, the launching portions of these multistrip couplers are angularly offset from their respective tapping portions in order to launch the tapped energy in particular directions corresponding to another favored direction in the substrate material. In all respects, this embodiment functions similarly to and has the same attributes as the other described embodiment of the invention, but has the additional advantage of providing more space between launching portions of the tapping multistrip couplers.

From the foregoing, it should be evident that there has herein been described an efficient and highly advantageous acoustic surface wave tapped delay line that exhibits a significantly reduced spurious echo characteristic and which does not require a high resolution lithographic fabrication process. Accordingly, the invention is simultaneously more reproducible at lower frequencies and permits higher frequency devices to be built. Thus, the arrays of the invention may be constructed by the scanning electron microscope technique which has, to date, produced useful surface wave devices above 1 GHz.

It should be understood that the materials used to fabricate the various embodiments of the invention are not critical and any material exhibiting similar desired characteristics may be substituted for those mentioned.

Although the present invention has been shown and described with reference to particular embodiments, nevertheless various changes and modifications which are obvious to persons skilled in the art to which the invention pertains are deemed to lie within the spirit, scope and contemplation of the invention.

I claim:

1. An acoustic surface wave tapped delay line, comprising:

a substrate of piezoelectric material, said material having a coincidence in at least two directions of a relatively high electromechanical coupling constant and collinear group and phase velocities of propagating acoustic surface wave energy;

transducer means including at least one electroacoustic transducer disposed on said substrate for launching a main acoustic surface wave energy beam in the plane of said substrate in one of said directions;

tapping means including at least one multistrip coupler disposed on said substrate, said coupler having a tapping portion in the path of said beam and having an angularly offset launching portion for propagating in another of said directions energy tapped from said beam; and receiving means including an electroacoustic receiving transducer disposed on said substrate in the path of said propagating energy launched from said angularly offset launching portion of said multistrip coupler for receiving said energy tapped from said beam.

2. The device according to claim 1, also comprising an acoustic energy absorbing element disposed on said substrate in the path of said main beam downstream of said tapping means.

3. The device according to claim 2, wherein said absorbing element is a viscous matter.

4. The device according to claim 2, wherein said absorbing element is an ion bombardment-produced high resistivity region on said substrate.

5. The device according to claim 1, also comprising an acoustic energy absorbing element disposed on said substrate on the side of said launching portion of said multistrip coupler opposite said receiving transducer.

6. The device according to claim 1, wherein said piezoelectric material is $y$-cut $z$-propagating $LiNbO_3$, and wherein said main beam is directed in said $z$-direction and said energy tapped from said beam propagates in an approximate direction ±22° with respect to said $z$-direction.

7. The device according to claim 1 wherein said tapping means includes a plurality of said multistrip couplers, successive ones of which are disposed with their offset launching portions on opposite sides of said main beam.

* * * * *